(12) United States Patent
West (10) Patent No.: US 8,358,023 B2
(45) Date of Patent: Jan. 22, 2013

(54) DRIVING TURBINE BLADE ASSEMBLY COMPRISING A PASSAGE THROUGH WHICH A FLUID MAY PASS

(76) Inventor: Stephen Mark West, Singapore (SG)

( * ) Notice: Subject to any disclaimer, the term of this patent is extended or adjusted under 35 U.S.C. 154(b) by 319 days.

(21) Appl. No.: 12/681,363

(22) PCT Filed: Oct. 6, 2008

(86) PCT No.: PCT/AU2008/001493
§ 371 (c)(1),
(2), (4) Date: Jun. 4, 2010

(87) PCT Pub. No.: WO2009/043119
PCT Pub. Date: Apr. 9, 2009

(65) Prior Publication Data
US 2010/0237620 A1   Sep. 23, 2010

(30) Foreign Application Priority Data
Oct. 4, 2007   (AU) ................................ 2007905470

(51) Int. Cl.
*F03B 13/10* (2006.01)
(52) U.S. Cl. ............................................. 290/43; 290/54
(58) Field of Classification Search ............... 290/43, 290/52, 54
See application file for complete search history.

(56) References Cited

U.S. PATENT DOCUMENTS

| | | | |
|---|---|---|---|
| 4,102,599 A | 7/1978 | Ziegler | |
| 4,120,602 A | 10/1978 | Megnint | |
| 4,424,452 A * | 1/1984 | Francis | 290/55 |
| 4,468,153 A | 8/1984 | Atencio | |
| 4,720,640 A * | 1/1988 | Anderson et al. | 290/43 |
| 5,383,768 A | 1/1995 | Siga et al. | |
| 6,835,043 B2 | 12/2004 | Milan et al. | |
| 7,116,005 B2 | 10/2006 | Corcoran | |
| 7,285,871 B2 * | 10/2007 | Derouineau | 290/52 |

(Continued)

FOREIGN PATENT DOCUMENTS

DE   3823587 A1   1/1990

(Continued)

OTHER PUBLICATIONS

International Search Report from PCT/AU2007/001510 dated Jan. 7, 2008.

*Primary Examiner* — Tho D Ta
(74) *Attorney, Agent, or Firm* — Knobbe Martens Olson & Bear LLP (57) ABSTRACT

A turbine unit (11) comprising a passage (23) through which a fluid may pass. Located within the passage (23) is a driving turbine blade set (25) upstream from a pumping turbine blade set (27) wherein the diameter of the pumping turbine blade is larger than the diameter of the driving turbine blade set. The driving turbine blade set and pumping turbine blade set are mounted in opposed relation whereby the turbine blade sets are in reversed orientation with respect to each other such that in simultaneous operation a region between the two turbine blade sets has a lower pressure than the fluid pressure at an opening of the passage. This induces a greater mass flow rate through the turbine unit than would otherwise be created by a pumping turbine blade set equal to or smaller in diameter than the driving turbine blade set.

42 Claims, 5 Drawing Sheets

U.S. PATENT DOCUMENTS

7,745,950 B2 *   6/2010   Lueck ............................. 290/52
2010/0102566 A1 *   4/2010   West et al. ..................... 290/54

FOREIGN PATENT DOCUMENTS

| EP | 1655457 | A1 | 5/2006 |
| FR | 2610672 | A1 | 8/1988 |
| NL | 7905389 | A | 1/1980 |
| RU | 2256081 | C1 | 7/2005 |
| WO | WO 2004/031577 | A2 | 4/2004 |
| WO | WO 2004/113717 | A1 | 12/2004 |
| WO | WO 2008/016584 | | 2/2008 |

* cited by examiner

DRIVING TURBINE BLADE ASSEMBLY COMPRISING A PASSAGE THROUGH WHICH A FLUID MAY PASS

FIELD OF THE INVENTION

The present invention generally relates to a turbine assembly. In particular the invention relates to a turbine assembly powered by a flowing fluid.

BACKGROUND ART

As the demand on earth's diminishing fossil fuels increase, research and development of alternative sources of energy is rapidly expanding. To date nuclear energy and renewable energy sources are dominant when considering alternative energy sources.

In relation to nuclear energy there are many significant disadvantages in the use of this fuel: waste disposal/storage, establishment costs and risk of accident, to name but a few.

In relation to renewable energy, such as wind, solar, and wave energy, the cost associated with the establishment of a sufficiently sized plant to harness the energy is, to date, a relatively expensive alternative. Furthermore, the plant only generates energy from these sources if these sources are present. As this is not always the case, the plant may lay idle, unable to produce any energy until the wind blows, the sun is present or the swell improves. As a result, these sources are only used to supplement energy supplied through conventional means.

Furthermore the apparatus used to harness renewable energy is quite large and cannot be used in portable or smaller applications, such as vehicles to supply the required power thereto.

Another problem with renewable energy alternatives is that the plant required to harness the energy is often unsightly and due to its size requires a large area of land or fluid body area.

The preceding discussion of the background to the invention is intended only to facilitate an understanding of the present invention. It should be appreciated that the discussion is not an acknowledgment or admission that any of the material referred to was part of the common general knowledge as at the priority date of the application.

It is an object of this invention to provide a turbine assembly which ameliorates or overcomes one or more of the disadvantages of the prior art or which provides a useful alternative.

DISCLOSURE OF THE INVENTION

The present invention provides a turbine unit comprising a passage through which a fluid may pass, located within the passage is a driving turbine blade set upstream from a pumping turbine blade set wherein the diameter of the pumping turbine blade is larger than the diameter of the driving turbine blade set, the driving turbine blade set and pumping turbine blade set are mounted in opposed relation whereby the turbine blade sets are in reversed orientation with respect to each other such that in simultaneous operation a region between the two turbine blade sets has a lower pressure than the fluid pressure at an opening of the passage, thereby inducing a greater mass flow rate through the turbine unit than would otherwise be created by a pumping turbine blade set equal to or smaller in diameter to the driving turbine blade set.

The present invention provides a turbine unit comprising a passage through which a fluid may pass, located within the passage is a driving turbine blade set upstream from a pumping turbine blade set wherein the diameter of the pumping turbine blade is larger than the diameter of the driving turbine blade set, the driving turbine blade set and pumping turbine blade set are mounted in opposed relation whereby the turbine blade sets are in reversed orientation with respect to each other such that in simultaneous operation, whereby they rotate in the same direction, a region between the two turbine blade sets has a lower pressure than the fluid pressure at an opening of the passage, thereby inducing a greater mass flow rate through the turbine unit than would otherwise be created by a pumping turbine blade set equal to or smaller in diameter to the driving turbine blade set.

Preferably the turbine unit is connected to one or more generators to convert the rotational movement of the turbine blade sets into electrical energy. Obviously the faster the turbine blade sets are caused to rotate the greater is the electrical energy produced.

The effect of having the diameter of the pumping turbine blade set larger than the diameter of the driving turbine blade set is significant. By increasing the pumping turbine blade set the power that can be produced by the unit is significantly greater than what would be generated by a similar turbine unit in which the diameter of the pumping turbine blade set is equal to or smaller than the diameter of the driving turbine blade set.

A turbine unit incorporating a pumping turbine blade set larger in diameter than the driving turbine blade set will, during operation, has a much lower pressure region between the two turbine blade sets than a pumping turbine blade set equal to or smaller than the driving turbine blade set. This in turn induces a greater velocity of flow, and therefore a greater mass flow, through the turbine unit. As a result the turbine blade sets rotate at a greater speed than a similar turbine unit wherein the driving turbine blade set and pumping turbine blade set are equal in size.

Turbine units having a larger pumping turbine blade set than the driving turbine blade set will allow power generation to be maximised due to the induction of a greater mass flow rate through the unit. This is of critical importance in those applications in which the turbine unit must be built to a specified size.

Preferably the ratio of diameter of the pumping turbine blade to the diameter of the driving turbine blade set is in the order of 1.1 to 2.1 whereby the blade sets experience maximum rotation such that the turbine unit experiences optimum energy conversion.

Each turbine blade set may be in the form of a set of blades which is rotated by the force of the fluid striking the blades.

In one aspect of the invention the reversed orientation of the driving turbine blade set with respect to the pumping turbine blade set may be such that the blades of the driving turbine blade set are reversed in a 180° manner from the blades of the pumping turbine blade set.

In another aspect of the invention the reversed orientation of the driving turbine blade set with respect to the pumping turbine blade set may be such that the blades of the driving turbine blade set are reversed to be a mirror image of the blades of the pumping turbine blade set when considered from a point between the two turbine blade sets.

Preferably the pumping turbine blade set creates a substantially lower pressure region downstream of the driving turbine blade set than what would be created in its absence. This is largely due to the orientation of the pumping turbine blade set relative to the driving turbine blade set. This increases the velocity of the fluid flowing therethrough. The pressure differential between a region external but in front of the turbine unit and the lower pressure region downstream of the driving turbine blade set induces a larger mass flow rate as fluid travels from the higher pressure region (front of the unit) to the lower pressure region. The higher pressure region could either be caused naturally (i.e. atmospheric pressure), or forced, (i.e. pumped or pressure head). Furthermore, the pumping turbine blade set evacuates the fluid from the unit, as well as lowering the potential aback flow pressure and energy losses normally associated with the pressure accumulation created behind the driving turbine blade set.

Furthermore, owing to the orientation of each turbine blade set with respect to each other, the effect of the second turbine blade set also minimises turbulence within the system, having the effect of straightening the fluid flow as it passes from the first turbine blade set.

The driving turbine blade set and pumping turbine blade set may be co-axially mounted. The turbine blade sets may be mounted on a common shaft such that the turbine blade sets rotate simultaneously. As the fluid flows through the passage, the flow drives the driving turbine blade set, causing the pumping turbine blade set to rotate at the same speed since they are mounted on the same shaft. As the pumping turbine blade set rotates, it effectively pulls the fluid toward it, creating a lower pressure region between the two turbine blade sets than would otherwise be experienced in its absence.

The shaft may be connected to a gearbox.

In another aspect of the invention the driving turbine blade set and pumping turbine blade set are independently mounted. The driving turbine blade set and pumping turbine blade set may be interconnected by a gearbox. In this arrangement the axis of rotation of the driving turbine blade set may be offset to the axis of rotation of the pumping turbine blade set.

Preferably the driving turbine blade set is in spaced apart relation with the pumping turbine blade set. The driving turbine blade set and pumping turbine blade set may be spaced to provide optimum flow conditions of the fluid through the passage between the blade sets.

The passage may comprise a chamber located between the two turbine blade sets. The chamber may be substantially conical such that it diverges outwardly from the driving turbine blade wheel to the pumping turbine blade wheel.

The passage may incorporate a converging portion located between a first end of the passage and the driving turbine blade set. This may be in the form of a converging nozzle. Preferably the configuration of the converging portion is such that the fluid deflected from the walls of the converging portion is directed onto the blades in a manner which minimises regions within the converging portion having a significantly reduced velocity relative to fluid entering the converging portion. In those configurations in which the angle of the walls is too great (i.e. the opening of the converging portion is substantially wider than the end of the converging portion), a portion of the fluid which deflects from the wall will collide with fluid deflected from another part of the wall. This will create regions within the converging portion of lower velocity which will affect the flow of fluid through the converging portion and therefore affect the performance of the turbine unit.

The converging portion and the portion of the chamber adjacent but downstream of the driving turbine blade set may provide a first venturi.

The passage may incorporate a diverging portion located between the pumping turbine blade set and a second end of the passage. This may be in the form of a diverging nozzle.

The diverging portion and the portion of the chamber adjacent but upstream of the pumping turbine blade set may provide a second venturi.

The passage of the turbine unit may incorporate a regulating means to regulate the fluid passing therethrough. The regulating means may be located upstream from the driving turbine blade set.

The gearbox may be located in or external to the chamber.

The gearbox may be covered by a shroud. When located in the chamber the shroud may be shaped to provide optimum flow conditions of the fluid through the chamber. The shroud may be shaped such that it cooperates with the chamber to accelerate fluid therethrough.

The turbine unit may comprise a plurality of driving turbine blade sets. The plurality of driving turbine blade sets may be in adjacent relationship within the passage.

The plurality of driving turbine blade sets may be of the same diameter.

The plurality of driving turbine blade sets may be housed in a cylindrical sleeve within the passage.

In another aspect of the invention the plurality of driving turbine blades sets has an increasing diameter as you move downstream from a first end of the passage.

The plurality of driving turbine blade sets may be housed in a sleeve within the passage, the sleeve diverging so as to accommodate the change in size of the driving turbine blade sets.

In another aspect of the invention the plurality of driving turbine blades sets has a decreasing diameter as you move downstream from the first end of the passage.

The plurality of driving turbine blade sets may be housed in a sleeve within the passage, the sleeve converging so as to accommodate the change in size of the driving turbine blade sets.

In a further aspect of the invention the plurality of driving turbine blade sets may have varying diameters.

The turbine unit may comprise a plurality of pumping turbine blade sets within the passage. The pumping turbine blade sets may be equal in size, converging or diverging in size in a downstream direction.

The turbine unit may comprise a stator located adjacent and upstream from the driving turbine blade set such that fluid is directed on to the blades of the turbine blade set.

A stator may be located in front of the pumping turbine blade set to direct fluid onto the blades of the turbine blade set.

A stator may be located in front of each of the plurality of driving turbine blade sets.

A stator may be located in front of each of the plurality of pumping turbine blade sets.

The one or more stators may be located on the common shaft.

Preferably the blades of the one or more stators are variably adjusted so that the fluid flow can be directed towards the blades of the respective turbine blade set to maximise movement of the turbine blade set.

The blades of each turbine blade set may be adjusted.

The passage may be contained in a housing.

The turbine unit may be connected to a generator. This may be by way of the gearbox.

The turbine unit may comprise a control system to initially start the unit so as to overcome the unit's inertia.

The present invention provides a turbine unit comprising a passage through which a fluid may pass, located within the passage is a driving turbine blade wheel and a pumping turbine blade wheel adapted to rotate in the same direction, the diameter of the pumping turbine blade wheel is larger than the driving turbine blade wheel wherein during operation the pumping turbine blade wheel rotates simultaneous to and in the same direction as the driving turbine blade wheel to increase the velocity and mass of the fluid therethrough than would otherwise be created by a pumping turbine blade set equal to or smaller in diameter than the driving turbine blade set.

The present invention provides a turbine unit comprising a passage through which a fluid may pass, located within the passage is a plurality of driving turbine blade sets and a pumping turbine blade set adapted to rotate in the same direction whereby during simultaneous operation the pumping turbine blade set increases the velocity of the fluid therethrough.

Preferably the diameter of the pumping turbine blade set is larger than the driving turbine blade sets.

Preferably there are three driving turbine blade sets. Preferably there is one pumping turbine blade set.

The turbine unit or a plurality thereof may be connected to a generator to convert the energy to power.

The present invention provides a turbine assembly comprising one or more turbine units as described above.

The present invention may be connected to any structure which is in or adjacent to a flowing fluid, such as a pipeline, or a structure which moves through a fluid, such as a car or a ship.

BRIEF DESCRIPTION OF THE DRAWINGS

The invention will be better understood by reference to the following description of several embodiments thereof as shown in the accompanying drawings in which:

FIG. 3 a,b,c is a schematic cross sectional view of a turbine unit according to a third embodiment of the invention;

BEST MODE(S) FOR CARRYING OUT THE INVENTION

Figure 1:
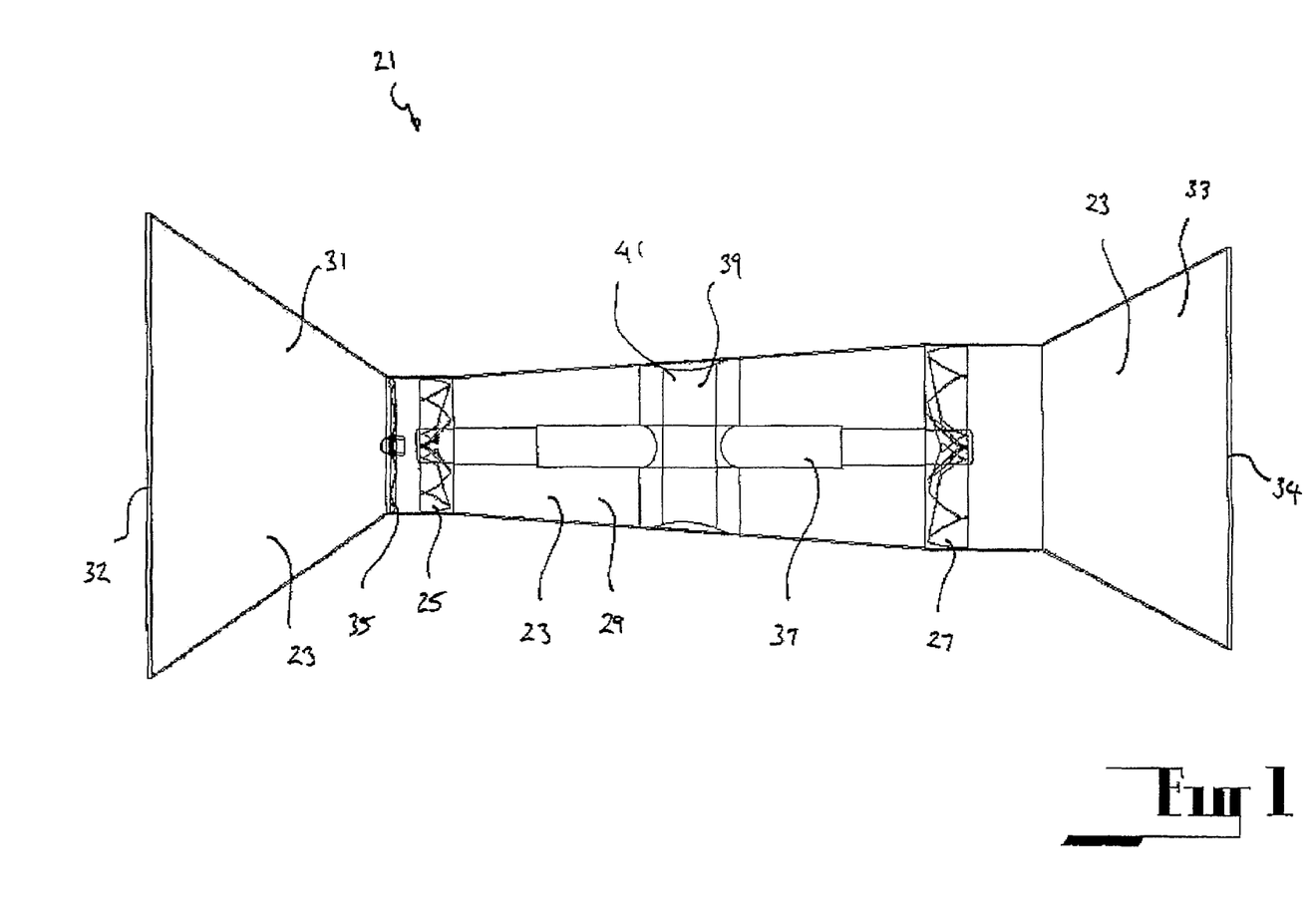
FIG. 1 is a schematic cross sectional view of a turbine unit according to a first embodiment of the invention.

Referring to FIG. 1 the invention according to a first embodiment of the invention is in the form of a turbine unit 21 comprising a passage 23 through which a fluid such as air or water may pass.

The turbine unit also comprises a driving turbine blade set 25 and a pumping turbine blade set 27 of larger diameter, mounted within the passage 23 in opposed relation such that the turbine blade sets 25, 27 are in reversed orientation with respect to each other. This configuration creates a region between the two turbine blade sets of significantly lower pressure than a region external and in front of passage 23. This has the effect of inducing fluid to flow therethrough, increasing the velocity and mass of the fluid through the passage 23.

The driving turbine blade set 25 and pumping turbine blade set 27 are in spaced apart relation to define a chamber 29 therebetween. The chamber 29 is conical in shape, diverging outwardly from the driving turbine blade set 25 to the pumping turbine blade set 27.

The turbine unit also comprises a stator 35 located adjacent and upstream from the driving turbine blade set 25 whereby the stator directs fluid on to the blades of the driving turbine blade set 25. The stator 35 is coaxially mounted in the passage 23 with respect to the turbine blade sets 25, 27. In this embodiment, the diameter of the stator 35 is equal to the diameter of the driving turbine blade set 25. As a result the diameter of the section of passage 23 passing between the two components is constant.

The passage 23 also incorporates a converging portion in the form of a converging nozzle 31 at a first end 32 of the passage 23. The converging nozzle 31 terminates at a position along the passage 23 where the stator 35 is located.

The passage 23 also incorporates a diverging portion in the form of a diverging nozzle 33 at a second end 34 of the passage 23. In this embodiment the diverging nozzle 33 terminates at a position along the passage 23 downstream from the pumping turbine blade set 27. As shown in FIG. 1 a section of the passage 23 of a diameter equal to that of the pumping turbine blade set 27 extends from the pumping turbine blade set 27 to the diverging nozzle 33.

The driving turbine blade set 25 and pumping turbine blade set 27 are co-axially mounted on a common shaft 37. As a result both turbine blade sets rotate at the same speed simultaneously when the fluid passes through the passage 23.

The common shaft 37 is connected to a gearbox 39 which is located in the chamber 29.

The gearbox 39 is covered by a shroud 41 wherein the shroud 41 is shaped to provide optimum flow conditions of the fluid through the chamber 39.

The gearbox 39 is connected to a generator (not shown) to convert the mechanical movement into electrical output.

As fluid enters the passage 23 of the turbine unit 21 it is accelerated through the converging nozzle 31 towards the stator 35 and onto the driving turbine blade set 25. The stator 35 directs the fluid onto the driving turbine blade set 25 to ensure maximum conversion of energy. As the driving turbine blade set rotates the pumping turbine blade set 27 rotates simultaneously. As this blade set 27 is larger it causes more fluid to move through the passage. The pumping turbine blade set 27 creates a significantly lower pressure region in the chamber as fluid passes through the chamber than would otherwise be experienced by a turbine unit having a pumping turbine blade set 27 of equal or smaller diameter than the driving turbine blade set 25. The pumping turbine blade set 27 also streamlines the fluid which contributes to the velocity of the fluid passing through the turbine unit 21.

As the blades of the pumping turbine blade set 27 are reversed to those of the driving blade set 25 the fluid is also caused to be pushed out of the passage 23. These factors, coupled with the low pressure developed by the diverging nozzle 33 add to induce a greater mass of fluid to move through the passage 23 than would otherwise be realised.

The ratio of the diameter of the turbine blade sets can be set to provide optimum power conversion. The below table, which is graphically represented in FIG. 5, details modelled results of fluid flowing at 4 m/s through the turbine unit 21 of FIG. 1 wherein the blade of the turbine blade sets 25, 27 are at an angle of 50 and the blades of the stator 35 are at an angle of 12. From the table it is apparent that the conversion of fluid flow to power generated is significant higher when the ratio of the diameter of the pumping turbine blade set 27 to driving turbine blade set 25 is 1.67.

TABLE 1

Power generated across four different blade diameter ratios

Figure 5:
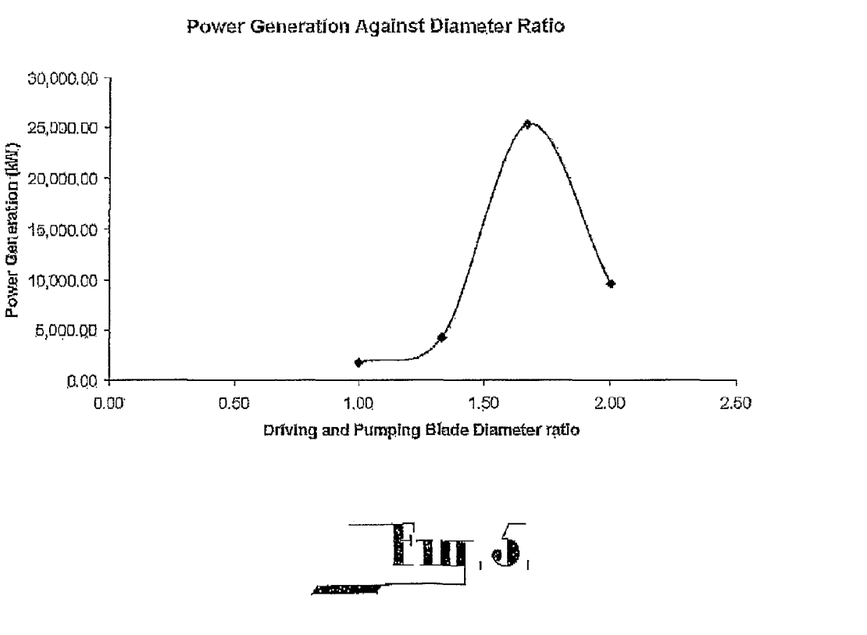
FIG. 5 is a graphical representation of the power generated against diameter ratio of the turbine blade sets according to specific conditions of an embodiment.

| Blade Diameter (m) | Blade Diameter Ratio | Stator Angle | Blade Angle | Velocity | RPM | Torque (N) | Power (kW) |
|---|---|---|---|---|---|---|---|
| 0.3 to 0.3 | 1.00 | 12.00 | 50.00 | 4.00 | 1,180 | 14,219 | 1,756 |
| 0.3 to 0.4 | 1.33 | 12.00 | 50.00 | 4.00 | 1,180 | 33,668 | 4,158 |
| 0.3 to 0.5 | 1.67 | 12.00 | 50.00 | 4.00 | 1,180 | 204,963 | 25,314 |
| 0.3 to 0.6 | 2.00 | 12.00 | 50.00 | 4.00 | 1,180 | 77,421 | 9,560 |

The above results were generated by modelling software COSMOSFloWorks 2007/PE SP3.0.

It is apparent from the above results that there is a significant increase in expected power generated when the pumping turbine blade set is larger in diameter than the driving turbine blade set. In the above example the optimum ratio is 1.67 which is modelled to provide over 14 times more power than a turbine unit in which the diameter of the pumping turbine blade set 27 is equal to the driving turbine blade set 25.

When the ratio of diameter of the pumping turbine blade set 27 to the diameter of the driving turbine blade set 25 is at an optimum ratio, the power which may be generated from the turbine unit is maximised. The preferred ratio is expected to be between 1.1 and 2.1 however, this may depend on a number of factors including the blade angle.

Figure 2:
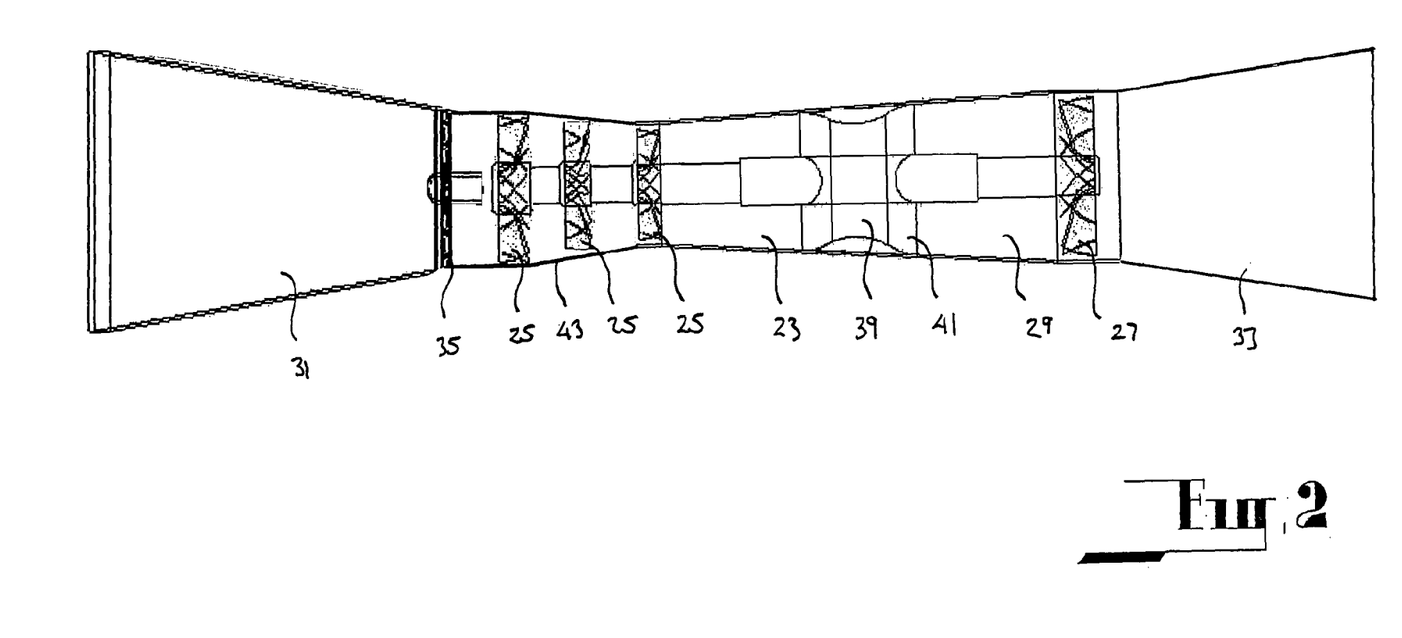
FIG. 2 is a schematic cross sectional view of a turbine unit according to a second embodiment of the invention.

Referring to FIG. 2 a second embodiment is shown. This embodiment is similar to the first embodiment with the exception that the turbine unit 21 has three driving turbine blade sets 25 having an increasing diameter in a downstream direction from the first end 32 of the passage 23.

The three driving turbine blade sets 25 are housed in a sleeve 43 within the passage 23, the sleeve 43 diverging so as to accommodate the change in size of the driving turbine blade sets 25.

Figure 3A:
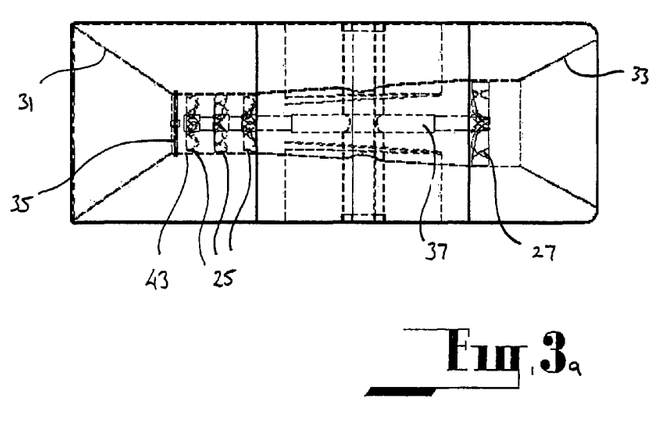
Figure 3B:
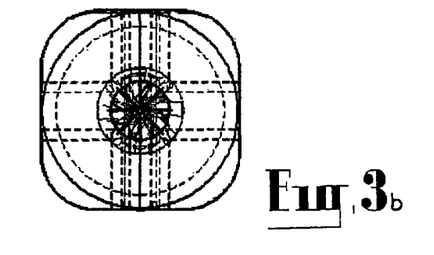
Figure 3C:
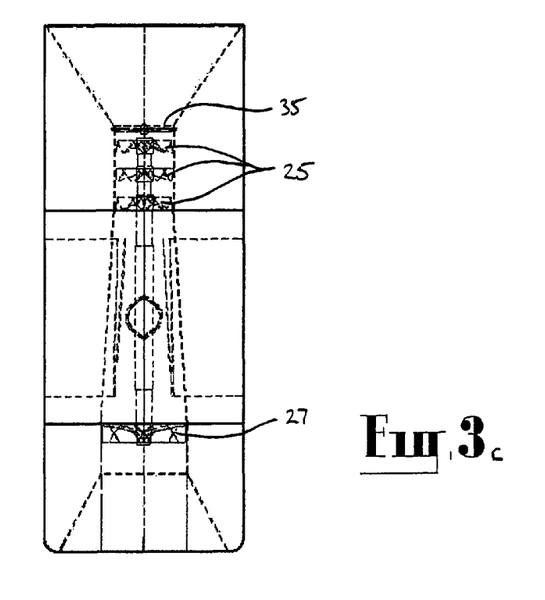
Figure 4:
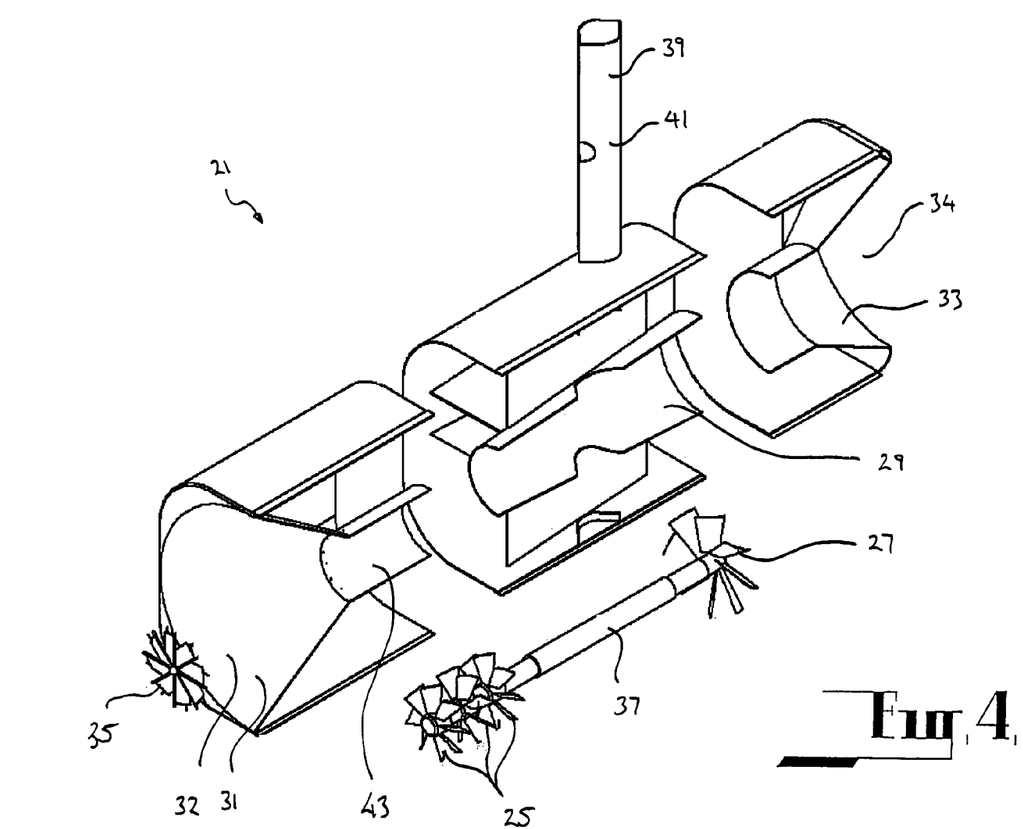
FIG. 4 is an exploded cross sectional view of a turbine unit according to a fourth embodiment of the invention.

Referring to FIGS. 3 and 4 a third embodiment similar to the second embodiment (FIG. 2) is shown. In this embodiment the turbine unit 21 also has three driving turbine blade sets 25 but which are of equal size. As a result the sleeve 43 in which they are housed is of constant diameter between the first and last driving turbine blade sets 25. The purpose of this technology is to derive power from flowing or moving fluids of any nature and may include but not limited to: rivers, fluid flow in pipes or conduits, oceans, air, wind, canals, or Brine.

The power can be utilised for many purposes to generate electricity or be used to drive machinery and/or implements or any nature without limitation to: power generators, ships and all boating, vehicles, trains, and aircraft.

Modifications and variations such as would be apparent to the skilled addressee are considered to fall within the scope of the present invention. For instance the gearbox may be located external to the turbine unit.

Throughout the specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A turbine unit comprising a passage through which a fluid may pass, located within the passage is a driving turbine blade set upstream from a pumping turbine blade set wherein the diameter of the pumping turbine blade set is larger than the diameter of the driving turbine blade set, the driving turbine blade set and pumping turbine blade set are mounted in opposed relation whereby the turbine blade sets are in reversed orientation with respect to each other such that in simultaneous operation, whereby they rotate in the same direction, a region between the two turbine blade sets has a lower pressure than the fluid pressure at an opening of the passage, thereby inducing a greater mass flow rate through the turbine unit than would otherwise be created by the pumping turbine blade set equal to or smaller in diameter than the driving turbine blade set.

2. The turbine unit according to claim 1, wherein the driving turbine blade set is in spaced apart relation with the pumping turbine blade set so as to provide optimum flow conditions of the fluid through the passage between the blade sets.

3. The turbine unit according to claim 1, wherein the passage is contained in a housing.

4. The turbine unit according to claim 1, comprising a control system to initially start the unit so as to overcome the unit's inertia.

5. A turbine assembly comprising one or more turbine units as described in claim 1.

6. The turbine unit according to claim 1, wherein each turbine blade set is in the form of a set of blades and which is rotated by the force of the fluid striking the blades.

7. The turbine unit according to claim 6, wherein the reversed orientation of the driving turbine blade set with respect to the pumping turbine blade set is such that the blades of the driving turbine blade set are reversed to be a mirror image of the blades of the pumping turbine blade set when considered from a point between the two turbine blade sets.

8. The turbine unit according to claim 1, wherein the driving turbine blade set and pumping turbine blade set are co-axially mounted.

9. The turbine unit according to claim 8, wherein the turbine blade sets are mounted on a common shaft such that the turbine blade sets rotate simultaneously.

10. The turbine unit according to claim 1, wherein the driving turbine blade set and pumping turbine blade set are independently mounted.

11. The turbine unit according to claim 10, wherein the driving turbine blade set and pumping turbine blade set are interconnected by a gearbox.

12. The turbine unit according to claim 10, wherein the axis of rotation of the driving turbine blade set is offset to the axis of rotation of the pumping turbine blade set.

13. The turbine unit according to claim 1, wherein the passage comprises a chamber located between the two turbine blade sets.

14. The turbine unit according to claim 13, wherein the chamber is substantially conical such that it diverges outwardly from the driving turbine blade wheel to the pumping turbine blade wheel.

15. The turbine unit according to claim 13, wherein the gearbox is located in or external to the chamber.

16. The turbine unit according to claim 1, wherein the passage incorporates a converging portion located between a first end of the passage and the driving turbine blade set.

17. The turbine unit according to claim 16, wherein the converging portion is in the form of a converging nozzle.

18. The turbine unit according to claim 16, wherein the configuration of the converging portion is such that the fluid deflected from the walls of the converging portion is directed onto the blades in a manner which minimizes regions within the converging portion having a significantly reduced velocity relative to fluid entering the converging portion.

19. The turbine unit according to claim 16, wherein the converging portion and the portion of the chamber adjacent but downstream of the driving turbine blade set provides a first venturi.

20. The turbine unit according to claim 1, wherein the passage incorporates a diverging portion located between the pumping turbine blade set and a second end of the passage.

21. The turbine unit according to claim 20, wherein the diverging portion is in the form of a diverging nozzle.

22. The turbine unit according to claim 20, wherein the diverging portion and the portion of the chamber adjacent but upstream of the pumping turbine blade set provides a second venturi.

23. The turbine unit according to claim 1, wherein the passage of the turbine unit incorporates a regulating means to regulate the fluid passing therethrough.

24. The turbine unit according to claim 23, wherein the regulating means is located upstream from the driving turbine blade set.

25. The turbine unit according to claim 9, wherein the shaft is connected to a gearbox.

26. The turbine unit according to claim 25, wherein the gearbox is covered by a shroud.

27. The turbine unit according to claim 1, comprising a plurality of driving turbine blade sets, each being in an adjacent relationship with each other within the passage.

28. The turbine unit according to claim 27, wherein each of the plurality of driving turbine blade sets has varying diameters.

29. The turbine unit according to claim 27, wherein each of the plurality of driving turbine blade sets is of the same diameter.

30. The turbine unit according to claim 29, wherein the plurality of driving turbine blade sets is housed in a cylindrical sleeve within the passage.

31. The turbine unit according to claim 27, wherein each of the plurality of driving turbine blades sets has an increasing diameter in a downstream direction from a first end of the passage.

32. The turbine unit according to claim 31, wherein the plurality of driving turbine blade sets is housed in a sleeve within the passage, the sleeve diverging so as to accommodate the change in size of the driving turbine blade sets.

33. The turbine unit according to claim 27, wherein each of the plurality of driving turbine blades sets has a decreasing diameter in a downstream direction from the first end of the passage.

34. The turbine unit according to claim 33, wherein the plurality of driving turbine blade sets is housed in a sleeve within the passage, the sleeve converging so as to accommodate the change in size of the driving turbine blade sets.

35. The turbine unit according to claim 1, comprising a plurality of pumping turbine blade sets within the passage.

36. The turbine unit according to claim 35, wherein the pumping turbine blade sets is equal in size, variable in size, or are converging or diverging in size in a downstream direction.

37. The turbine unit according to claim 6, comprising one or more stators to direct fluid on to the blades of one or more of the relevant turbine blade set.

38. The turbine unit according to claim 37, wherein the one or more stators is located on the common shaft.

39. The turbine unit according to claim 6, wherein the reversed orientation of the driving turbine blade set with respect to the pumping turbine blade set is such that the blades of the driving turbine blade set are reversed in a 1800 manner from the blades of the pumping turbine blade set.

40. The turbine unit according to claim 39, wherein the blades of each turbine blade set are adjustable.

41. The turbine unit according to claim 1, wherein the turbine unit is connected to one or more generators to convert the rotational movement of the turbine blade sets into electrical energy.

42. The turbine unit according to claim 41, wherein the turbine unit is connected to the generator via the gearbox.

* * * * *